(12) United States Patent
Mahatme et al.

(10) Patent No.: US 10,734,047 B1
(45) Date of Patent: Aug. 4, 2020

(54) SRAM BASED PHYSICALLY UNCLONABLE FUNCTION AND METHOD FOR GENERATING A PUF RESPONSE

(71) Applicant: NXP USA, INC., Austin, TX (US)

(72) Inventors: Nihaar N. Mahatme, Austin, TX (US); Srikanth Jagannathan, Austin, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/260,751

(22) Filed: Jan. 29, 2019

(51) Int. Cl.
| G11C 11/419 | (2006.01) |
| G11C 7/24 | (2006.01) |
| H04L 9/32 | (2006.01) |
| G11C 29/02 | (2006.01) |
| G11C 11/418 | (2006.01) |

(52) U.S. Cl.
CPC .............. G11C 7/24 (2013.01); G11C 11/418 (2013.01); G11C 11/419 (2013.01); G11C 29/021 (2013.01); G11C 29/028 (2013.01); H04L 9/3278 (2013.01)

(58) Field of Classification Search
CPC ... G11C 11/418; G11C 11/419; G11C 29/021; G11C 29/028; H04L 9/3278
See application file for complete search history.

(56) References Cited

U.S. PATENT DOCUMENTS

| 8,848,477 | B2 | 9/2014 | Schrijen et al. | |
| 9,947,391 | B1 * | 4/2018 | Mahatme | G11C 11/419 |
| 2013/0093502 | A1 * | 4/2013 | Kim | H01H 85/0241 327/525 |
| 2013/0194886 | A1 * | 8/2013 | Schrijen | G11C 5/148 365/226 |
| 2015/0016183 | A1 | 1/2015 | Sinangil et al. | |
| 2015/0236698 | A1 * | 8/2015 | Pedersen | G09C 1/00 326/8 |
| 2015/0311875 | A1 | 10/2015 | Chen et al. | |
| 2016/0065379 | A1 * | 3/2016 | Holcomb | G09C 1/00 713/189 |
| 2016/0182045 | A1 * | 6/2016 | Mai | G09C 1/00 326/8 |

(Continued)

OTHER PUBLICATIONS

Claes, Mathias et al.; "Comparison of SRAM and FF PUF in 65nm Technology;" NordSec'11 Proceedings of the 16th Nordic Conference on Information Security Technology for Applications; Oct. 26-28, 2011; Tallinn, Estonia; doi>10.1007/978-3-642-29615-4_5.

(Continued)

*Primary Examiner* — Mushfique Siddique (57) ABSTRACT

A data processing system includes an SRAM array, wherein the plurality of SRAM cells provide a physically unclonable function (PUF). A PUF evaluation engine includes a selection circuit for selecting one or more word lines coupled to the plurality of SRAM cells in response to a challenge, and a cross-coupled latch coupled to two bit lines corresponding to two different SRAM cells of the plurality of SRAM cells. The cross-coupled latch is configured to provide one of two 2-bit values depending on which of the two bit lines discharges faster upon the two different SRAM cells being selected by the selection circuit, wherein the 2-bit value is part of a digital code provided in response to the challenge.

20 Claims, 7 Drawing Sheets

(56) References Cited

U.S. PATENT DOCUMENTS

| | | | |
|---|---|---|---|
| 2018/0102163 A1* | 4/2018 | Lin | G11C 11/419 |
| 2018/0218177 A1* | 8/2018 | Kuenemund | G06F 21/72 |
| 2018/0261262 A1 | 9/2018 | Lee | |
| 2019/0058603 A1* | 2/2019 | Lin | G11C 11/4091 |
| 2020/0020364 A1* | 1/2020 | Tsai | G11C 11/419 |
| 2020/0044871 A1* | 2/2020 | Lu | H04L 9/3278 |

OTHER PUBLICATIONS

Hussain, Siam U. et al.; "BIST-PUF: Online, Hardware-Based Evaluation of Physically Unclonable Circuit Identifiers;" 2014 IEEE/ACM International Conference on Computer-Aided Design (ICCAD); Nov. 2-6, 2014, San Jose, California; DOI: 10.1109/ICCAD.2014.7001347.

Schrijen, Geert-Jan et al.; "Comparative Analysis of SRAM Memories Used as PUF Primitives;" Design, Automation and Test in Europe Conference & Exhibition (DATE); Mar. 12-16, 2012, Dresden, Germany; DOI: 10.1109/DATE.2012.6176696.

Selimis, Georgios et al.; "Evaluation of 90nm 6T-SRAM as Physical Unclonable Function for Secure Key Generation in Wireless Sensor Nodes;" 2011 IEEE International Symposium of Circuits and Systems (ISCAS) 2011.

Suh, G. Edward et al.; "Physical Unclonable Functions for Device Authentication and Secret Key Generation;" Design Automation Conference, Jun. 4-8, 2007, San Diego, California.

Zhang, Fengchao et al.; "Current Based PUF Exploiting Random Variations in SRAM Cells;" Design, Automation & Test in Europe Conference & Exhibition (DATE); Mar. 14-18, 2016, Dresden, Germany.

* cited by examiner

SRAM BASED PHYSICALLY UNCLONABLE FUNCTION AND METHOD FOR GENERATING A PUF RESPONSE

BACKGROUND

Field

This disclosure relates generally to electronic circuits and more specifically to a static random access memory (SRAM) based physically unclonable function (PUF) and method for generating a PUF response.

Related Art

A physically unclonable function (PUF) is a physical system that will ideally produce an unpredictable but repeatable response when a specific stimulus is input. An example PUF uses a static random access memory (SRAM). SRAM cells are bi-stable, meaning they only have two stable states. When powered up, the bi-stable SRAM cell will settle in one of the two stable states. Because a conventional SRAM is normally laid out to be symmetrical, the state it will be in when powered-up is unpredictable. However, manufacturing variations, temperature, power supply, switching noise, device aging, and other factors may cause some of the cells of the PUF to power-up in different states at different times. Because of this randomness, no two integrated circuits are exactly alike and so the output of the PUF is difficult to predict, and therefore difficult to recreate. This makes the PUF useful for storing unique information about the IC. For example, the PUF may be used to generate a digital fingerprint or encryption/decryption key.

Many current solutions focus on the start-up behaviors of SRAMs to generate the PUF. However, these implementations, in general, suffer from poor immunity to thermal noise as well as to aging, which causes the start-up state of the SRAMs to not be reliable. Therefore, a need exists for implementing a PUF that provides a stable and reliable value, while providing immunity to aging and common mode noise, and preferably maintaining a compact circuit size and reduced power consumption.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided a PUF implemented in a plurality of SRAM cells in an SRAM array in which the PUF responses are based on competing discharging SRAM bit cell currents between two selected SRAM columns through the use of digital circuitry. In one embodiment, a pair of selected bit cells are written with 0's and the pair of bit lines of the selected bit cells are precharged. A digital cross-coupled latch has inputs coupled to the pair of selected bit lines and, after the precharging, evaluates to one of two different 2-bit output values depending on which of the two selected bit lines discharges faster. In this embodiment, one bit line of the pair of bit lines is connected via an inverter to a first input of the cross-coupled latch and the other bit line of the pair of bit lines is connected via another inverter to a second input of the cross-coupled latch. Whichever bit line discharges faster causes the corresponding inverter on that bit line to flip (before the other inverter corresponding to the other bit line flips). This results in a single output of the cross-coupled latch flipping states while the other output of the cross-coupled latch remains unchanged. Due to the nature of the cross-coupled latch, when the other inverter of the other bit line eventually flips as well due to the slower discharge, the outputs of the cross-coupled latch remain unchanged, in which, after the evaluation, the outputs of the cross-coupled latch provide two bits of a PUF response. Note that N selected SRAM bit cells provides N bits of the PUF response, using N/2 cross-coupled latches. Implementing the SRAM PUF in this manner provides a more stable signature that is repeatable, yet also provides high randomness. The approach also provides better resistance to aging, immunity to common-mode noise, and higher reliability, while maintaining a compact circuit size by not requiring large analog components.

Figure 1:
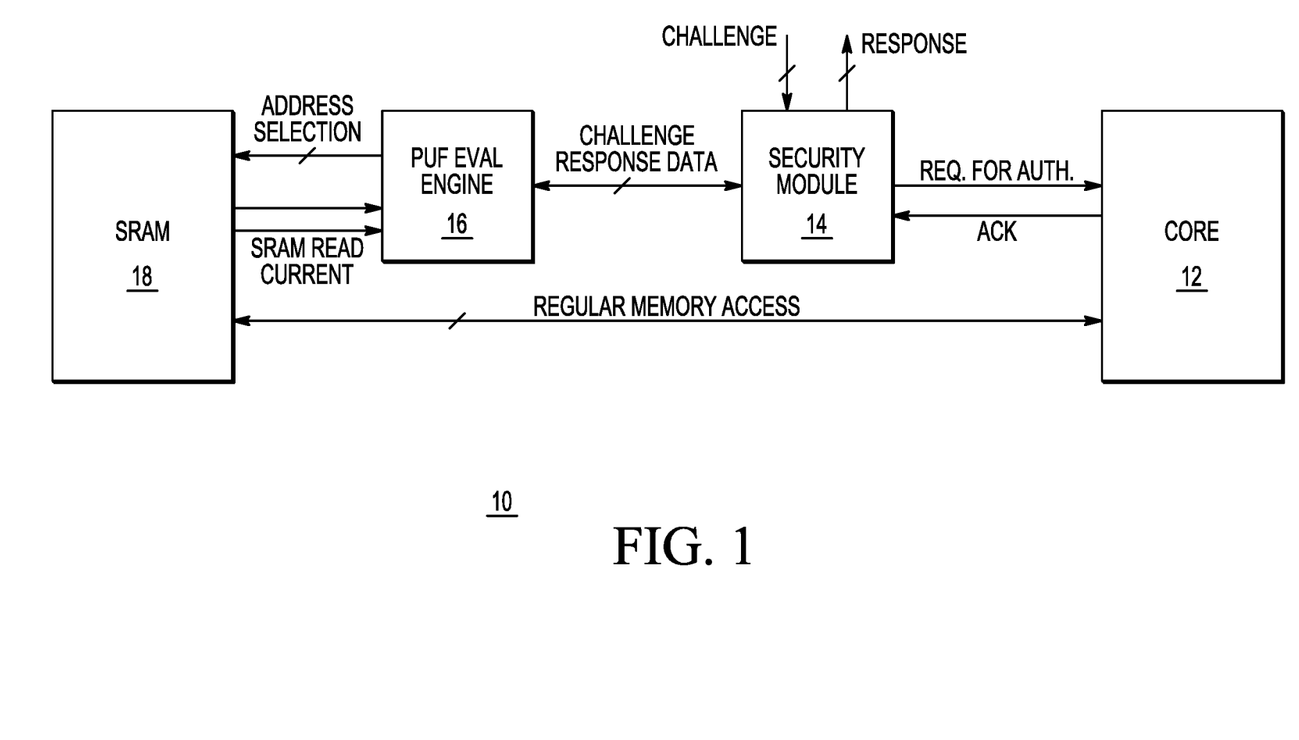
FIG. 1 illustrates a system in accordance with an embodiment.

FIG. 1 illustrates a data processing system 10 in accordance with an embodiment. Data processing system 10 includes processor core 12, security module 14, PUF evaluation engine 16 and SRAM 18. Processor core 12 can be any kind of processor core for executing instructions. Processor core 12 is bi-directionally connected to SRAM 18 for regular read and write operations. Processor core 12 is also connected to security module 14 to provide an acknowledge signal ACK when a request for authentication (REQ FOR AUTH) is requested by security module 14. Security module 14 provides the request for authentication in response to receiving a challenge signal from a requestor. When response data RESPONSE DATA is needed because a challenge labeled CHALLENGE is received from a requestor, PUF evaluation engine 16 provides an address to SRAM 18. In response, SRAM 18 provides SRAM read currents back to PUF evaluation engine 16. PUF evaluation engine 16 evaluates the SRAM currents and generates a PUF response which provides a digital code. The digital code is used to generate a unique chip ID, encryption/decryption key, digital signature, or the like. Note that only the circuits used to generate the PUF response are illustrated. For the purposes of simplicity and clarity, some or all the circuits used for normal read and write operations of SRAM 18 are omitted.

Figure 2:
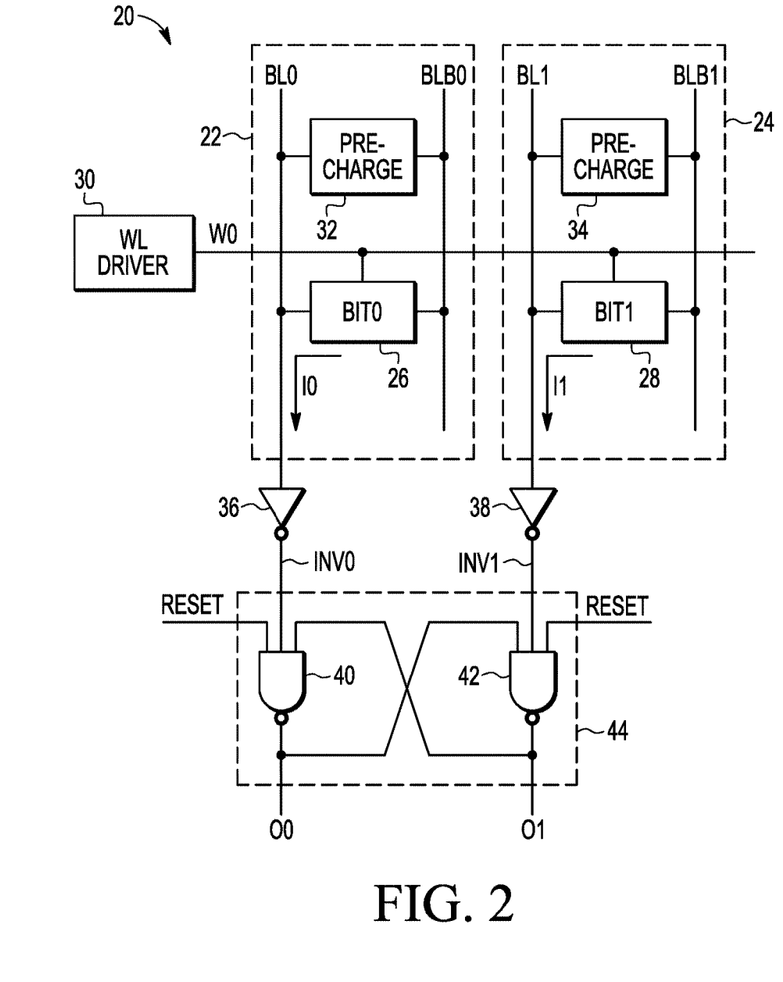
FIG. 2 illustrates a portion of the system in FIG. 1 for outputting a PUF response in accordance with an embodiment.

FIG. 2 illustrates a portion 20 of the data processing system 10 in FIG. 1 for outputting a PUF response in accordance with an embodiment. Portion 20 includes SRAM cell columns 22 and 24, SRAM cells 26 and 28, precharge circuits 32 and 34, inverters 36 and 38, word line driver 30, and cross-coupled latch 44. SRAM cell columns 22 and 24 are a part of SRAM array 18 in FIG. 1. Inverters 36 and 38 and cross-coupled latch 44 may be referred to as evaluation circuitry and may be located in PUF Evaluation Engine 16. Precharge circuits 32 and 34 may be considered part of an SRAM array 18 or part of PUF Evaluation Engine 16. SRAM array 18 includes a plurality of SRAM cells organized in rows and columns. The plurality of SRAM cells form a PUF that is used to generate a PUF response. In the illustrated embodiment, a column includes a bit line pair, including a true bit line and a complementary bit line, and all the SRAM cells connected to the bit line pair. A row includes a word line and all the SRAM cells connected to the word line. The rows and columns intersect so that a memory cell is coupled to a word line and a bit line pair at the intersections. In other embodiments, the memory organization may be different.

In column 22, a bit line pair labeled BL0 and BLB0 intersect with a word line labeled WL. A representative SRAM cell 26 is illustrated connected to word line WL and bit line pair BL0 and BLB0 where they intersect but are not electrically connected. Many more word lines intersect bit line pair BL0 and BLB0 (not shown). Note that bit line BLB is a logical complement of bit line BL. Likewise, column 24 includes bit line pair BL1 and BLB1 and representative SRAM cell 28 connected to bit line pair BL1 and BLB1 and word line WL. Precharge circuit 32 is coupled to BL0 and BLB0, and precharge circuit 34 is coupled to BL1 and BLB1. Inverter 36 has an input connected to bit line BL0 of column 22, and a first input of cross-coupled latch 44 is coupled to receive an output of inverter 36. Inverter 38 has an input connected to bit line BL1 of column 24, and a second input of cross-coupled latch 44 is coupled to receive an output of inverter 38. A first output of cross-coupled latch 44 provides a first PUF response O0 and a second output of cross-coupled latch 44 provides a second PUF response O1. Therefore, for a pair of SRAM columns, such as columns 24 and 26, the true bit lines BL from each bit line pair of the PUF are connected via inputs of inverters to corresponding inputs of a cross-coupled latch to produce PUF responses, while the complementary bit lines BLBs are not used to produce PUF responses. (Note that the true and complementary bit lines may be reversed such the complementary bit lines rather than the true bit lines are used to produce the PUF responses.)

Cross-coupled latch 44 receives two data inputs (corresponding to outputs of inverters 36 and 38), a RESET input, and outputs two one-bit PUF responses, O0 and O1, in which O0 and O1 together provide a 2-bit value. Cross-coupled latch 44 includes NAND gates 40 and 42. A first input of NAND gate 40 is coupled to receive a RESET signal, a second input is coupled to the output of inverter 36, and a third input is coupled to an output of NAND gate 42. A first input of NAND gate 42 is coupled to receive the RESET signal, a second input is coupled to the output of inverter 38, and a third input is coupled to an output of NAND gate 40. The output of NAND gate 40 provides O0, and the output of NAND gate 42 provides O1. The operation of portion 20 will be discussed below in the discussion of FIGS. 4, 5, and 6.

Note that in alternate embodiments, different embodiments of cross-coupled latch 44 may be used in which cross-coupled latch 44 includes a reset input which allows the output to be reset to a known value before entering an evaluation phase in which the PUF responses are determined based on the SRAM currents. However, cross-coupled latch 44 may include other cross-coupled logic gates or digital elements, other than NAND gates, in which the output of a logic gate or digital element of the latch is provided as an input to another logic gate or element of the latch. Similarly, different logic gates than inverters 36 and 38 may be used which receive the bit line at an input and provide an inversion of the bit line at an output that is coupled to a corresponding input of the cross-coupled latch. Also, the circuitry used to provide the SRAM-based PUF responses is all digital, which allows for a more compact circuit size that other solutions which require analog circuit components.

Figure 3:
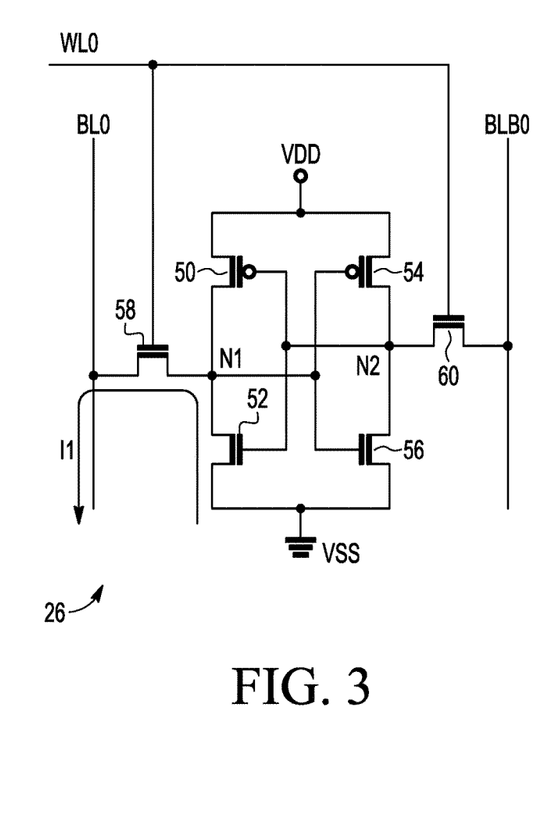
FIG. 3 illustrates an embodiment of an SRAM cell of FIG. 2.

FIG. 3 illustrates an embodiment of SRAM cell 26 of FIG. 2. SRAM cell 26 is a six transistor SRAM cell and includes P-channel transistors 50 and 54, and N-channel transistors 52, 56, 58, and 60. N-channel transistor 52 and P-channel transistor 50 form a first inverter, and N-channel transistor 56 and P-channel transistor 54 for a second inverter. The two inverters are cross-coupled to form two storage nodes labeled N1 and N2. N-channel transistors 58 and 60 are access transistors for coupling the bit lines to storage nodes N1 and N2. In other embodiments, the SRAM cells of SRAM array 18 may be different. The cross-coupled inverters are connected between power supply voltage terminal VDD and ground terminal VSS. The transistors may be implemented using an appropriate conventional complementary metal-oxide semiconductor (CMOS) process.

The PUF responses are generated based on the SRAM cell currents provided from a selected pair of SRAM columns in which variations of the selected SRAM cells result in different discharge rates of the bit lines of the selected pair of SRAM columns. As will be described below, it is this variation that allows for the PUF responses to be generated, as the 2-bit output of cross-coupled latch 44 depends on which discharge rate of the selected pair of bit lines is faster. Therefore, in order to rely on these variations to produce the PUF responses, inverters 36 and 38 are matched as are the elements connected to inverters 36 and 38 in latch 44 (such as NAND gates 40 and 42).

Figure 4:
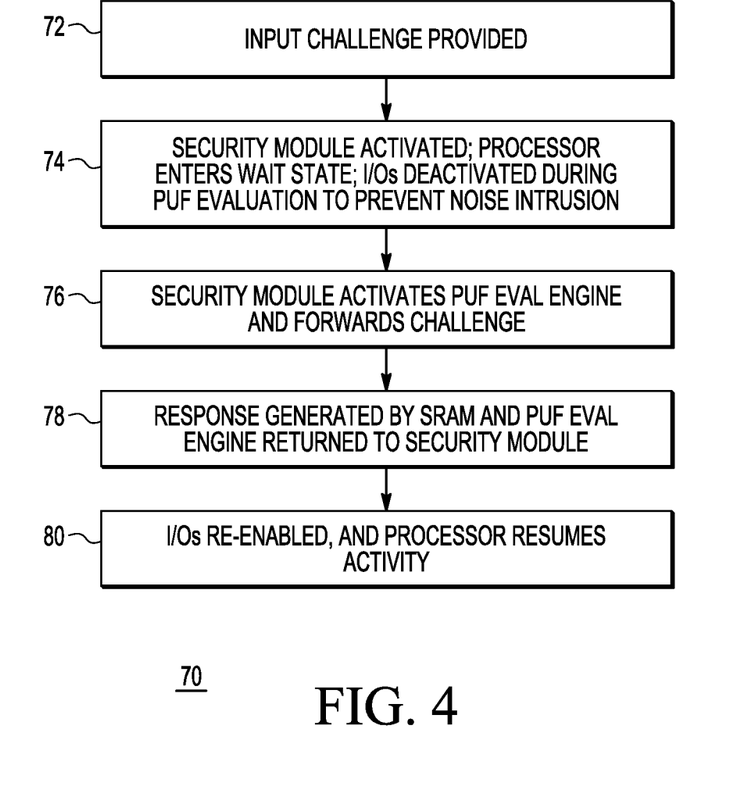
FIG. 4 illustrates a method for generating a PUF response in the system of FIG. 1, in accordance with an embodiment.

FIG. 4 illustrates a method 70 for generating a PUF response in the data processing system of FIG. 1. Referring now to FIGS. 1-4, method 70 begins at step 72. At step 72, an input challenge is provided to security module 14 from a requestor. At step 74, security module 14 is activated if not already active. The processor may enter an inactive state, such as a wait state and input/output (I/O) circuits are deactivated during PUF evaluation to prevent noise caused by the switching of large output transistors from affecting the PUF evaluation. At step 76, security module 14 activates PUF evaluation engine 16 and then forwards the challenge to PUF evaluation engine 16. At step 78, PUF evaluation engine 16 evaluates the SRAM cells that comprise the PUF, and provides a PUF response (e.g. O0 and O1) generated in response to the challenge. The PUF responses are provided based on competing discharging bit line currents. At step 80, the I/Os are re-enabled. The PUF response is provided to security module 14, and security module 14 may forward the PUF response to the requestor. Security module 14 may also process the PUF response further before providing a response to the requestor. Processor core 12 resumes normal processing. Processor core 12 may access SRAM 18 for regular read and write access. Also, processor core 12 may communicate with security module 14 in response to, for example, requests for authentication.

Figure 5:
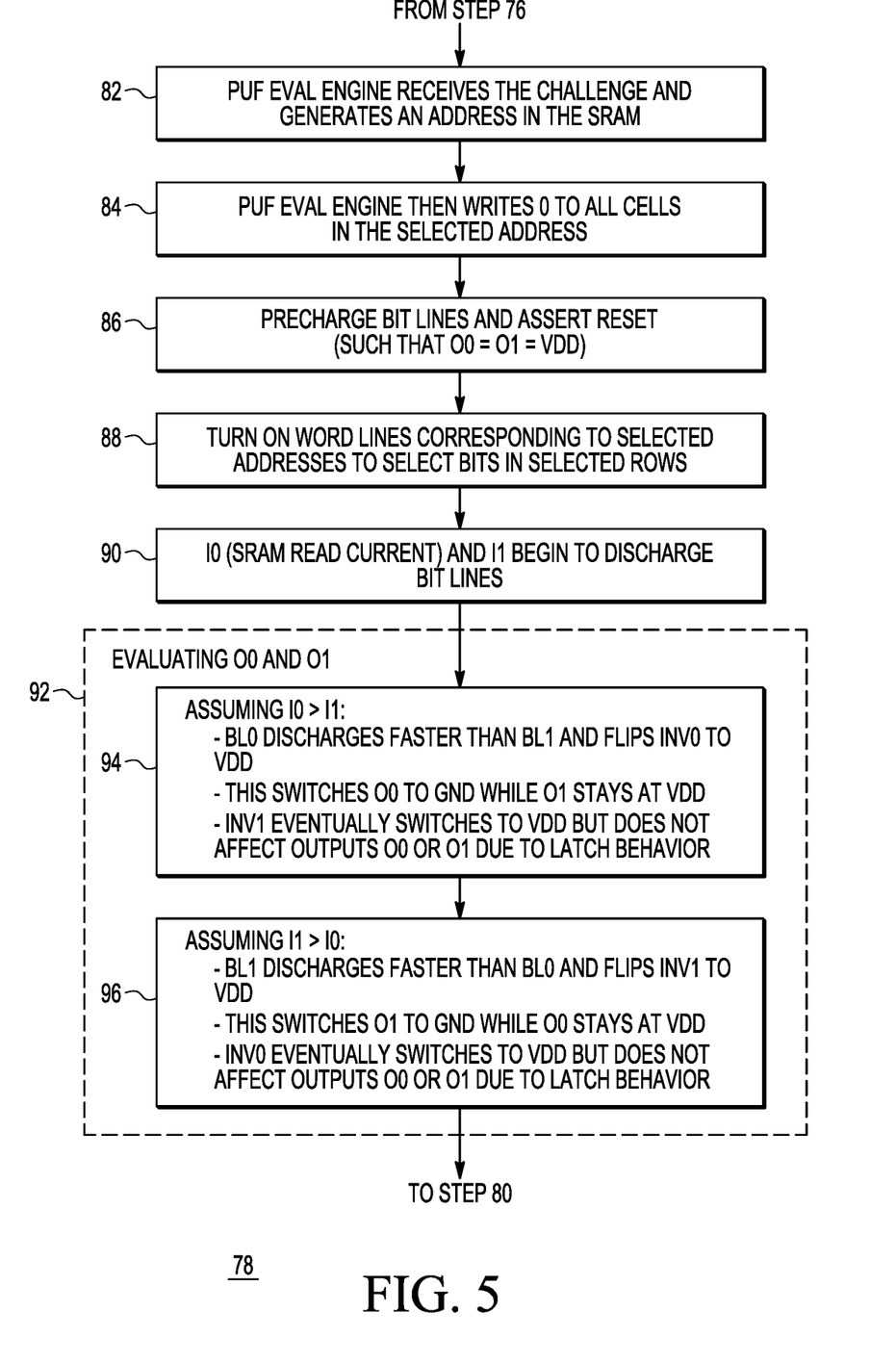
FIG. 5 illustrates more detail of a step in the method of FIG. 4, in accordance with an embodiment.
Figure 6:
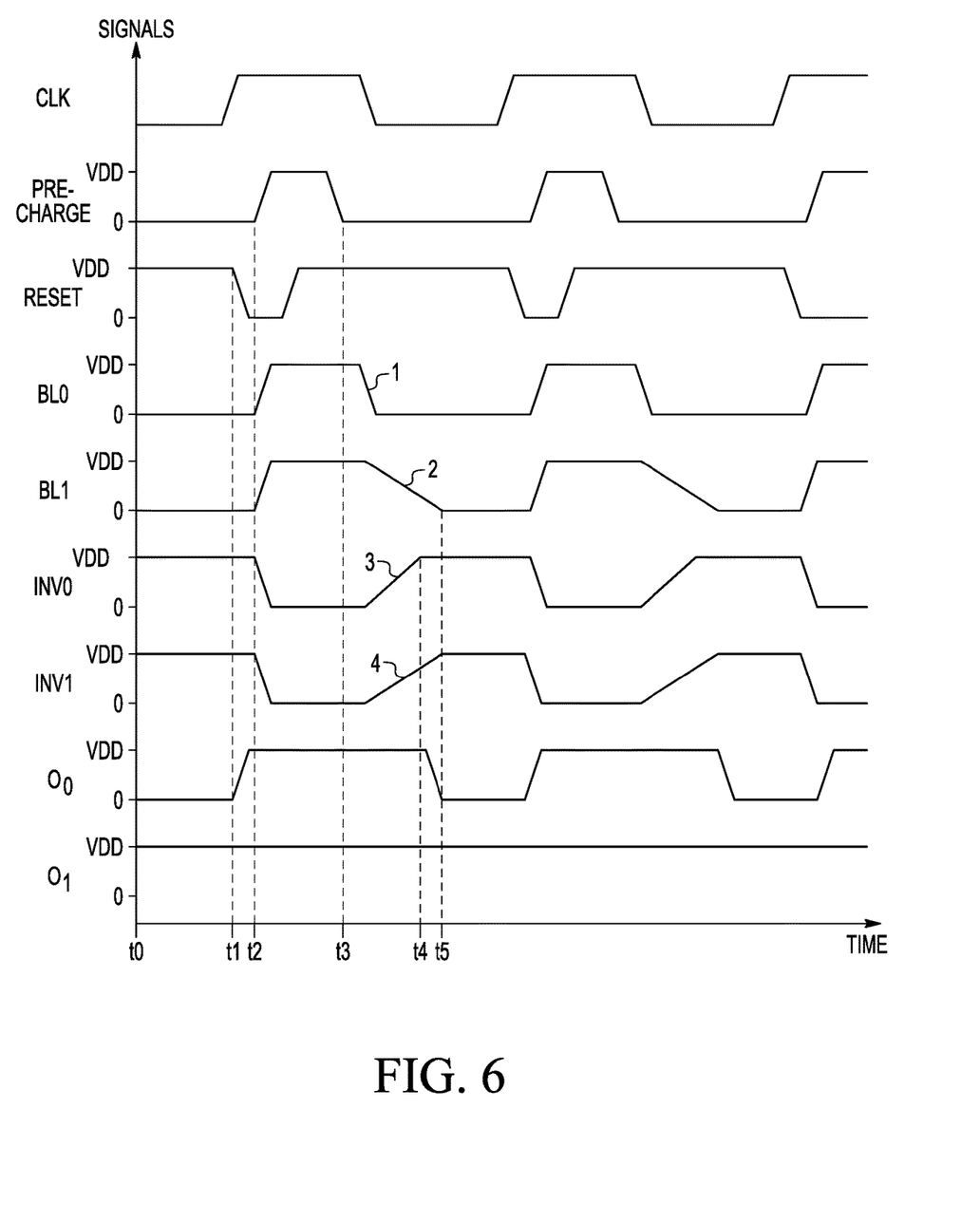
FIG. 6 illustrates a timing diagram for generating a PUF response in the system of FIG. 1, in accordance with an embodiment.

FIG. 5 illustrates more detail of step 78 in method 70 of FIG. 4, and will be discussed in combination with the timing diagram of FIG. 6. The more detailed step 78 begins at step 82. At step 82, PUF evaluation engine 16 receives the challenge and generates an address to access the PUF in SRAM array 18. In the illustrated embodiment, the PUF may include all of SRAM 18 or a portion thereof, depending on how many bits are required for the PUF and the size of SRAM array 18. If only a portion of the array is used, the PUF may use one contiguous area of SRAM array 18 or be distributed over the array. At step 84, the address selects the SRAM cells of the PUF and PUF evaluation engine 16 causes logic zeros to be written into the selected SRAM cells. Referring to FIG. 3, the logic zero is written by biasing the true bit line BL0 with a logic zero and the complementary bit line BLB0 with a logic one. Access N-channel transistors 58 and 60 are conductive because word line WL is a logic high causing storage node N1 to be low and storage node N2 to be high. The high storage node N1 causes the gate of transistors 50 and 52 to be high so that P-channel transistor 50 is off, or non-conductive, and N-channel transistor 52 is on, or conductive. The low voltage at storage node N1 causes N-channel transistor 56 to be non-conductive.

After writing a 0 to all cells with the selected address, at step 86, the bit lines are pre-charged to a supply voltage, e.g., VDD. For example, referring to FIG. 2, PUF evaluation engine 16 causes precharge circuit 32 to precharge BL0 and precharge circuit 34 to precharge BL1. This is illustrated in FIG. 6 with the first precharge pulse on the precharge signal, starting at time t2. Also at step 86, active-low RESET is asserted (to a logic level 0), illustrated at time t1 in FIG. 6. Therefore, referring to latch 44 of FIG. 2, with RESET at 0, O0=O1=VDD. As seen in FIG. 6, shortly after time t1, O0 goes high and O1 remains high, and at time t2, BL0 and BL1 begin precharging to VDD (corresponding to a logic level 1), and INV0 (at the output of inverter 36) and INV1 (at the output of inverter 38) go to 0. Next, at step 88 of FIG. 5, the word-lines corresponding to the selected addresses are turned on (activated) to select bits in selected rows of SRAM 18. Referring to the example of FIG. 2, WL0 is turned on (activated) to selected BIT0 26 and BIT1 28 (which were previously written with a 0 at step 84). At step 90, referring to FIG. 6, active-low RESET is de-asserted to a logic level 1 and the precharge pulse ends at time t3, after which the SRAM read currents (e.g. I0 and I1 of FIG. 2) begin to discharge the corresponding bit lines (e.g. BL0 and BL1). The evaluation of O0 and O1 occurs at step 92 in response to the discharging bit lines.

As indicated above, due to manufacturing variations, one of the pair of selected bit lines (BL0 or BL1) will discharge faster. Step 94 of evaluation step 92 corresponds to the situation in which BL0 discharges faster, and step 96 of evaluation step 92 corresponds to the situation in which BL1 discharges faster. Referring first to step 94, in which I0 is greater than I1, BL0 discharges faster than BL1 causing INV0 to flip to a logic level 1 at time t4, prior to INV1 flipping to a logic level 1 at time t5. As illustrated in FIG. 6, the discharge rate or fall time of BL0, identified as ramp "1," is faster (i.e. steeper) than the discharge rate of BL1, identified as ramp "2". Hence, the rise time of INV0, identified as ramp "3," is faster than the rise time of INV1, identified as ramp "4." When INV0 flips to a logic level 1, this results in O0 switching to ground (a logic level 0) due to NAND gate 40 having all ones at its inputs. Note that O1, though, remains at 1 (VDD). INV1 eventually switches to a logic level 1 as well, at time t5 in FIG. 6, but, due to the cross-coupled nature of latch 44, the outputs O0 and O1 remain unaffected. That is, O0 remains at GND and O1 remains at VDD. This provides a binary value of "01" for O0/O1. (Note that the second clock cycle in FIG. 6 is a repeat of the first clock cycle, in which O0/O1 evaluates to "01")

Referring now to step 96 of evaluation step 92 (not explicitly illustrated in the timing diagram of FIG. 6), I1 is greater than I0, and BL1 discharges faster than BL0 which causes INV1 to flip to a logic level 1, prior to INV0 flipping to a logic level 1. When INV1 flips to a logic level 1, this results in O1 switching to ground (a logic level 0) due to NAND gate 42 having all ones at its inputs. Note that O0, though, remains at 1 (VDD). INV0 eventually switches to VDD as well, but, due to the cross-coupled nature of latch 44, the outputs O0 and O1 remain unaffected. That is, O1 remains at GND and O0 remains at VDD. This provides a binary value of "10" for O0/O1 (as compared to "01" in the example above of step 94). Therefore, the value of O0/O1 depends on the different discharge rates of BL0 and BL1. In this manner, PUF responses can be provided for any number of selected SRAM column pairs, such as columns 22 and 24.

Note that using the bit line currents through the conductive N-channel transistors of the cells provides higher resilience to aging compared to the P-channel transistors of the cells. Also, a read current through the N-channel transistors is a DC current in the micro-amps range that provides resistance to noise, unlike the start-up behavior of the cell which is sensitive to noise. However, in another embodiment, the currents may be provided through the P-channel transistors of the SRAM cells. Note also that the implementation of inverters 36 and 38 as well as cross-coupled latch 44 is a purely digital implementation used to generate the PUF responses, such as O0 and O1. This allows for a compact circuit size, especially as compared to other solutions which rely on analog comparators or larger analog components, such as resistors. This also allows for lower power consumption and faster PUF response generation as compared to analog solutions.

Figure 7:
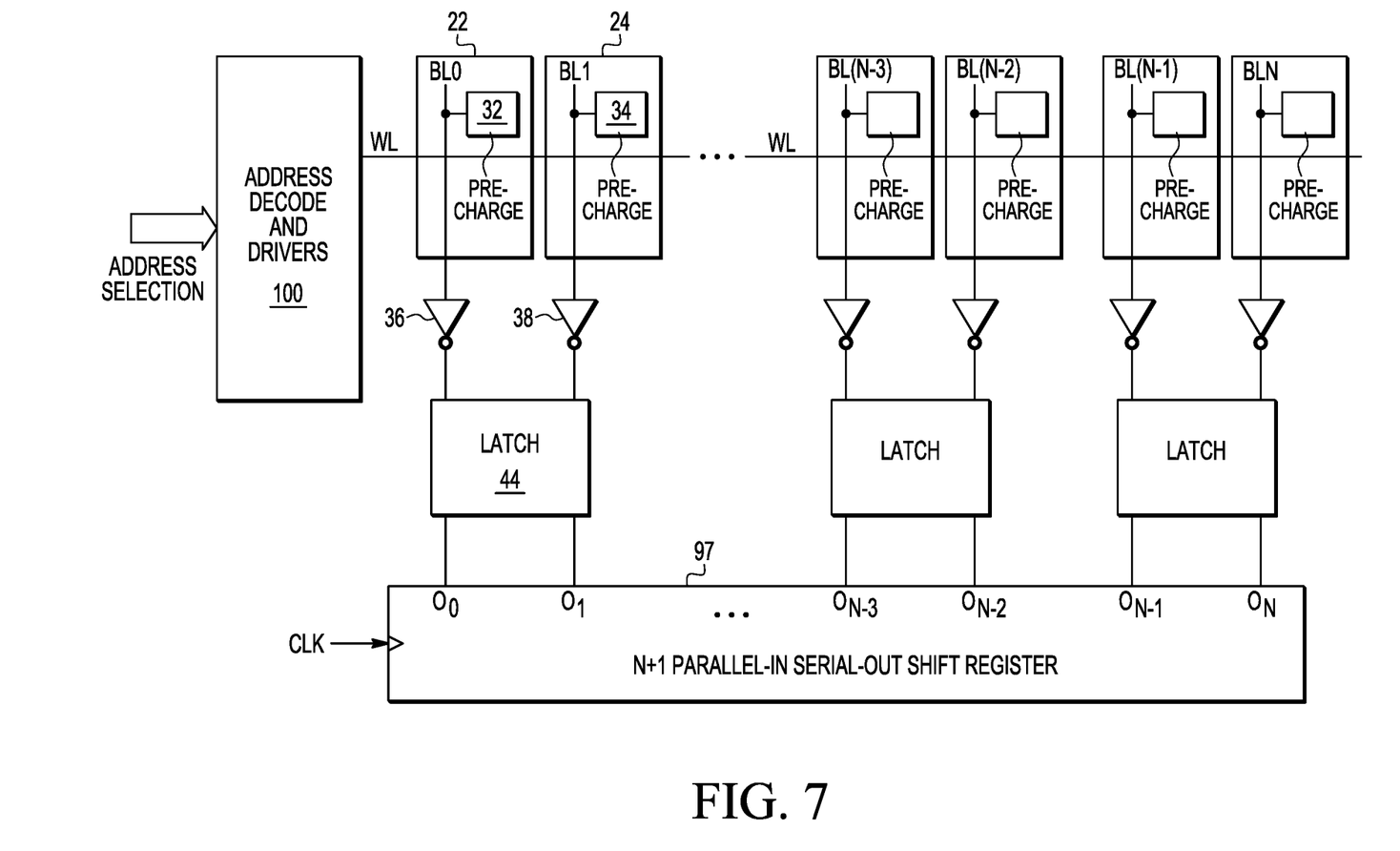
FIG. 7 illustrates a portion of the system of FIG. 1 for outputting a PUF response in accordance with an embodiment.

FIG. 7 illustrates a portion of the data processing system of FIG. 1 and FIG. 2 for outputting a PUF response in accordance with an embodiment. In FIG. 7, a cross-coupled latch is provided for each pair of columns used to generate PUF responses. Only the true bit line of each column is provided for comparison, the complementary bit line of each column is not connected. An "N+1" bit parallel-in serial-out shift register 97 is connected to the outputs of each cross-coupled latch, such as cross-coupled latch 44, to receive the results of the evaluation of step 78 in FIG. 5. The value N is an odd integer, in which "N+1" corresponds to the number of columns being used, which also corresponds to the number of bits in the PUF response, O0 to ON. This requires the use of N+1 precharge circuits (e.g. like precharge circuits 32 and 34) and N+1 inverters (e.g. like inverters 36 and 38), corresponding to each bit line BL0-BLN, and (N+1)/2 cross-coupled latches (e.g. like cross-coupled latch 44). An address decoder and WL drivers 100 is illustrated receiving an address labeled ADDRESS SELECTION. A word line WL is selected by the received address. Note that address decoder and WL drivers 100 may also be referred to as a selection circuit.

Figure 8:
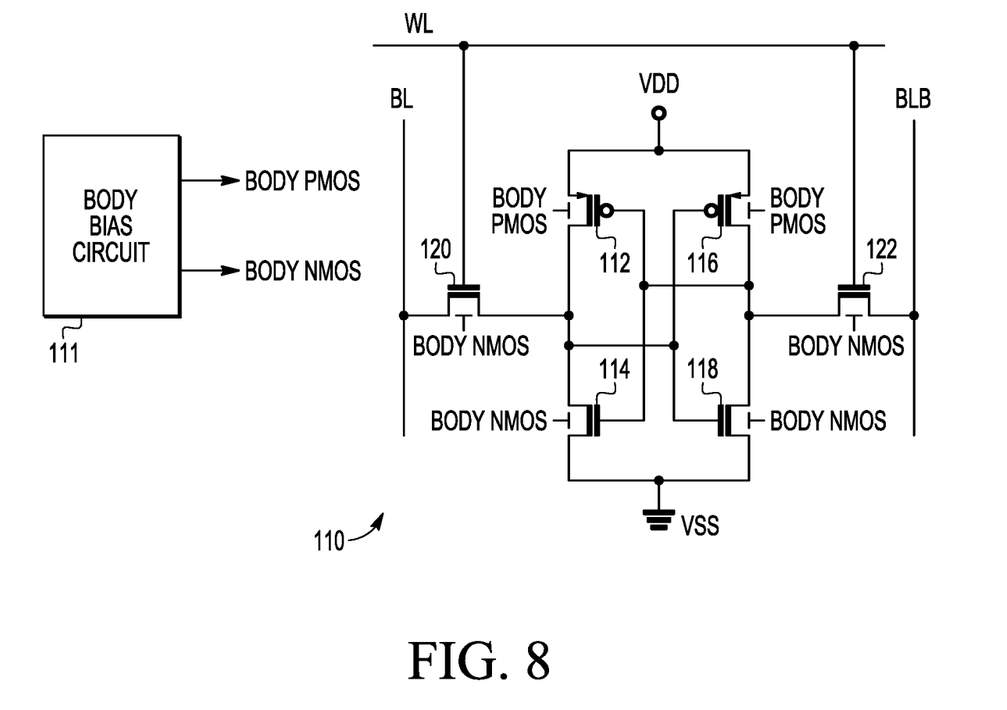
FIG. 8 illustrates another embodiment of an SRAM cell in accordance with an embodiment.

FIG. 8 illustrates an SRAM cell 110 and body bias circuit 111 for use in another embodiment. SRAM cell 110 is a six transistor SRAM cell and includes P-channel transistors 112 and 116, and N-channel transistors 114, 118, 120, and 122. N-channel transistor 114 and P-channel transistor 112 form a first inverter, and N-channel transistor 118 and P-channel transistor 116 for a second inverter. The two inverters are cross-coupled. N-channel transistors 120 and 122 are access transistors. Each of the transistors has a body terminal. A body terminal of P-channel transistors 112 and 116 is labeled BODY PMOS and a body terminal of N-channel transistors 114, 118, 120, and 122 is labeled BODY NMOS. A body bias voltage, commonly referred to as a back bias, may be provided to each of the body terminals for adjusting the transistor threshold voltage VT. Body bias circuit 111 generates body bias voltages labeled BODY PMOS and BODY NMOS for being selectively provided to the body terminals with the same name. Adjusting the body bias can increase VT resulting in a decrease in the difference between a gate-to-source voltage VGS and VT. The decreased difference in VGS–VT can increase randomness and increase the likelihood of difference between cells currents I0 and I1 in FIG. 2 which improves the stability of the signature as latch 44 of FIG. 2 can more easily resolve. In the illustrated embodiment, it is only necessary or desirable to adjust the body bias to the N-channel transistors because only the current through the N-channel transistors is being compared. However, in another embodiment, where different currents are being compared, then it may be desirable to adjust the threshold voltages of other cell transistors. A body bias condition that operates the transistors near or below the threshold voltage will be effective in achieving this increased relative variation of read currents.

Therefore, by now it can be understood how an SRAM-based PUF response can be provided based on competing discharging SRAM read currents between two selected SRAM columns through the use of digital circuitry, including a cross-coupled latch. The cross-coupled latch includes two outputs which evaluates to one of two different 2-bit values depending on which of the two selected bit lines discharges faster. The SRAM bit cells provide a source of randomness, and these PUF responses cannot be determined through inspection of the circuit. Furthermore, the use of the digital circuitry to evaluate PUF responses in response to varying discharge rates between two bit lines allows the implementation to be reproducible and not affected by thermal noise, aging, and voltage/temperature variations.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Below are described embodiments of the present invention.

In one embodiment, a method for generating a digital code in a data processing system includes selecting a plurality of static random access memory (SRAM) cells for a write operation; writing a predetermined logic state to all the plurality of SRAM cells; precharging a bit line of a first SRAM cell of the plurality of SRAM cells and a bit line of a second SRAM cell of the plurality of SRAM cells to a first supply voltage, wherein the first and second SRAM cells are different SRAM cells of the plurality of SRAM cells; resetting each of a first and a second output of a cross-coupled latch to a first logic state; coupling the bit line of the first SRAM cell to a first input of a first logic gate configured to provide an inverted value of the bit line of the first SRAM cell at an output of the first logic gate; coupling the bit line of the second SRAM cell to a first input of a second logic gate configured to provide an inverted value of the bit line of the second SRAM cell at an output of the second logic gate, wherein the output of the first logic gate and the output of the second logic gates are provided as inputs to a cross-coupled latch; generating a current on the bit lines of the first and second SRAM cells; and using the cross-coupled latch to evaluate logic bits provided by the first and second outputs of the cross-coupled latch, wherein the first and second outputs of the cross-coupled latch together provide a first 2-bit value when the current on the bit line of the first SRAM cell is greater than the current on the bit line of the second SRAM cell and a second 2-bit value, different from the first 2-bit value, when the current on the bit line of the second SRAM cell is greater than the current on the bit line of the first SRAM cell. In one aspect of this embodiment, the using the cross-coupled latch to evaluate logic bits provided by the first and second outputs of the cross-coupled latch includes, when the current on the bit line of the first SRAM cell is greater than the current on the bit line of the second SRAM cell, the cross-coupled latch changes only the first output of the cross-coupled latch to a second logic state, different than the first logic state, while the second output remains unchanged, when the current on the bit line of the second SRAM cell is greater than the current on the bit line of the first SRAM cell, the cross-coupled latch changes only the second output of the cross-coupled latch to a second logic state while the first output remains unchanged, and after the evaluation, the digital code includes the evaluated logic bits provided by the first and second outputs of the cross-coupled latch. In another aspect, the plurality of SRAM cells comprises a physically unclonable function (PUF) and the digital code is a PUF response. In another aspect, the method further includes receiving a challenge from a security module, wherein the providing the logic bit occurs in response to the challenge. In yet another aspect, writing a predetermined logic state to all the plurality of SRAM cells further comprising writing a logic zero to all the plurality of SRAM cells. In another aspect, the method further includes selectively adjusting a body bias to at least one of transistor of the plurality of SRAM cells to change a threshold voltage of the at least one of transistor. In another aspect, the method further includes deactivating input/output circuitry in the data processing system prior to the step of generating a current of the bit lines. In yet another aspect, generating the current on the bit lines further includes generating the current through an N-channel transistor of each of the first and second SRAM cells.

In another embodiment, a data processing system includes an SRAM array having a plurality of SRAM cells, each SRAM cell of the plurality of SRAM cells coupled to a bit line and to a word line, wherein the plurality of SRAM cells provide a physically unclonable function (PUF); and a PUF evaluation engine coupled to the plurality of SRAM cells, the PUF evaluation engine including a selection circuit for selecting one or more word lines coupled to the plurality of SRAM cells in response to a challenge; and a cross-coupled latch coupled to two bit lines corresponding to two different SRAM cells of the plurality of SRAM cells and configured to provide one of two 2-bit values depending on which of the two bit lines discharges faster upon the two different SRAM cells being selected by the selection circuit, wherein the 2-bit value is part of a digital code provided in response to the challenge. In one aspect of this another embodiment, the data processing system further includes a first inverter connected between a first bit line of the two bit lines and the cross-coupled latch, and a second inverter connected between a second bit line of the two bit lines and the cross-coupled latch. In a further aspect, each cross-coupled latch includes a first logic gate and a second logic gate, the first logic gate having a first input coupled to an output of the first inverter and a second input coupled to an output of the second logic gate, the second logic gate having a first input coupled to an output of the second inverter and a second input coupled to an output of the first logic gate. In yet a further aspect, each of the first and the second logic gate are characterized as NAND gates. In another aspect of the another embodiment, the plurality of SRAM cells includes N cells, where N is an even integer greater than 1, and are grouped into N/2 groups of two SRAM cells, wherein the PUF evaluation engine includes N/2 cross-coupled latches, each cross-coupled latch coupled to a group of two SRAM cells, the cross-coupled latch coupled to a first bit line corresponding to a first SRAM cell of the group via a first logic gate and a second bit line corresponding to a second SRAM cell of the group via a second logic gate. In a further aspect, each of the first and second logic gates is characterized as an inverter. In another further aspect, each cross-coupled latch is configured to provide one of two 2-bit values depending on which of the first and second bit lines discharges faster upon the group of two SRAM cells being selected by the selection circuit, wherein each 2-bit value is part of the digital code provided in response to the challenge. In a further aspect, each cross-coupled latch includes a first logic gate and a second logic gate, the first logic gate having a first input coupled to an output of the first inverter and a second input coupled to an output of the second logic gate, the second logic gate having a first input coupled to an output of the second inverter and a second input coupled to an output of the first logic gate. In yet a further aspect, each of the first and the second logic gates is characterized as an NAND gate. In another aspect of the another embodiment, the data processing system further includes a precharge circuit coupled to a bit line of each SRAM cell of the plurality of SRAM cells, wherein the precharge circuits are configured to precharge the bit line of each SRAM cell of the plurality of SRAM cells prior to the selection circuit selecting one or more word lines coupled to the plurality of SRAM cells in response to the challenge.

In yet another embodiment, a data processing system includes a processor core; an SRAM array coupled to the processor core, the SRAM array having a plurality of SRAM cells, each SRAM cell of the plurality of SRAM cells coupled to a bit line and to a word line, wherein the plurality of SRAM cells provides a physically unclonable function (PUF); a PUF evaluation engine coupled to the plurality of SRAM cells, the PUF evaluation engine including a selection circuit for selecting one or more word lines coupled to the plurality of SRAM cells in response to a challenge, an inverter coupled to each of two bit lines corresponding to two different SRAM cells of the plurality of SRAM cells, and a cross-coupled latch coupled to outputs of the inverters coupled to the two bit lines, wherein the cross-coupled latch is configured to provide one of two 2-bit values depending on which of the two bit lines discharges faster upon the two different SRAM cells being selected by the selection circuit, wherein the 2-bit value is part of a digital code provided in response to the challenge; and a precharge circuit coupled to a bit line of each SRAM cell of the plurality of SRAM cells, wherein the precharge circuits are configured to precharge the bit line of each SRAM cell of the plurality of SRAM cells prior to the selection circuit selecting one or more word lines coupled to the plurality of SRAM cells in response to the challenge. In one aspect of the yet another embodiment, the plurality of SRAM cells includes N cells, where N is an even integer greater than 1, and are grouped into N/2 groups of two SRAM cells, wherein the PUF evaluation engine comprises N inverters coupled to bit lines of the N cells and N/2 cross-coupled latches, each cross-coupled latch coupled to a group of two SRAM cells, the cross-coupled latch coupled to a first bit line corresponding to a first SRAM cell of the group via a first inverter of the N inverters and a second bit line corresponding to a second SRAM cell of the group via a second inverter of the N inverters.

What is claimed is:

1. A method for generating a digital code in a data processing system, the method comprising:
    selecting a plurality of static random access memory (SRAM) cells for a write operation;
    writing a predetermined logic state to all the plurality of SRAM cells;
    precharging a bit line of a first SRAM cell of the plurality of SRAM cells and a bit line of a second SRAM cell of the plurality of SRAM cells to a first supply voltage, wherein the first and second SRAM cells are different SRAM cells of the plurality of SRAM cells;
    resetting each of a first and a second output of a cross-coupled latch to a first logic state;
    coupling the bit line of the first SRAM cell to a first input of a first logic gate configured to provide an inverted value of the bit line of the first SRAM cell at an output of the first logic gate;
    coupling the bit line of the second SRAM cell to a first input of a second logic gate configured to provide an inverted value of the bit line of the second SRAM cell at an output of the second logic gate, wherein the output of the first logic gate and the output of the second logic gates are provided as inputs to a cross-coupled latch;
    generating a current on the bit lines of the first and second SRAM cells; and
    using the cross-coupled latch to evaluate logic bits provided by the first and second outputs of the cross-coupled latch, wherein the first and second outputs of the cross-coupled latch together provide a first 2-bit value when the current on the bit line of the first SRAM cell is greater than the current on the bit line of the second SRAM cell and a second 2-bit value, different from the first 2-bit value, when the current on the bit line of the second SRAM cell is greater than the current on the bit line of the first SRAM cell, wherein the using the cross-coupled latch to evaluate logic bits provided by the first and second outputs of the cross-coupled latch comprises:
  when the current on the bit line of the first SRAM cell is greater than the current on the bit line of the second SRAM cell, the cross-coupled latch changes only the first output of the cross-coupled latch to a second logic state, different than the first logic state, while the second output remains unchanged,
  when the current on the bit line of the second SRAM cell is greater than the current on the bit line of the first SRAM cell, the cross-coupled latch changes only the second output of the cross-coupled latch to a second logic state while the first output remains unchanged, and
  after the evaluation, the digital code includes the evaluated logic bits provided by the first and second outputs of the cross-coupled latch.

2. The method of claim 1, wherein the plurality of SRAM cells comprises a physically unclonable function (PUF) and the digital code is a PUF response.

3. The method of claim 1, further comprising receiving a challenge from a security module, wherein the providing the logic bit occurs in response to the challenge.

4. The method of claim 1, wherein writing a predetermined logic state to all the plurality of SRAM cells further comprising writing a logic zero to all the plurality of SRAM cells.

5. The method of claim 1, further comprising selectively adjusting a body bias to at least one of transistor of the plurality of SRAM cells to change a threshold voltage of the at least one of transistor.

6. The method of claim 1, further comprising deactivating input/output circuitry in the data processing system prior to the step of generating a current of the bit lines.

7. The method of claim 1, generating the current on the bit lines further comprises generating the current through an N-channel transistor of each of the first and second SRAM cells.

8. A data processing system comprising:
  an SRAM array having a plurality of SRAM cells, each SRAM cell of the plurality of SRAM cells coupled to a bit line and to a word line, wherein the plurality of SRAM cells provide a physically unclonable function (PUF); and
  a PUF evaluation engine coupled to the plurality of SRAM cells, the PUF evaluation engine comprising:
    a selection circuit for selecting one or more word lines coupled to the plurality of SRAM cells in response to a challenge, and
    a cross-coupled latch coupled to two bit lines corresponding to two different SRAM cells of the plurality of SRAM cells and configured to provide one of two 2-bit values depending on which of the two bit lines discharges faster upon the two different SRAM cells being selected by the selection circuit, wherein the 2-bit value is part of a digital code provided in response to the challenge.

9. The data processing system of claim 8, further comprising:
  a first inverter connected between a first bit line of the two bit lines and the cross-coupled latch, and a second inverter connected between a second bit line of the two bit lines and the cross-coupled latch.

10. The data processing system of claim 9, wherein each cross-coupled latch comprises a first logic gate and a second logic gate, the first logic gate having a first input coupled to an output of the first inverter and a second input coupled to an output of the second logic gate, the second logic gate having a first input coupled to an output of the second inverter and a second input coupled to an output of the first logic gate.

11. The data processing system of claim 10, wherein each of the first and the second logic gate are characterized as NAND gates.

12. The data processing system of claim 8, wherein the plurality of SRAM cells includes N cells, where N is an even integer greater than 1, and are grouped into N/2 groups of two SRAM cells, wherein the PUF evaluation engine comprises N/2 cross-coupled latches, each cross-coupled latch coupled to a group of two SRAM cells, the cross-coupled latch coupled to a first bit line corresponding to a first SRAM cell of the group via a first logic gate and a second bit line corresponding to a second SRAM cell of the group via a second logic gate, wherein each cross-coupled latch provides a corresponding 2-bit value that is part of the digital code provided in response to the challenge.

13. The data processing system of claim 12, wherein each of the first and second logic gates is characterized as an inverter.

14. The data processing system of claim 12, wherein each cross-coupled latch is configured to provide one of two 2-bit values depending on which of the first and second bit lines discharges faster upon the group of two SRAM cells being selected by the selection circuit.

15. The data processing system of claim 14, wherein each cross-coupled latch comprises a first logic gate and a second logic gate, the first logic gate having a first input coupled to an output of the first inverter and a second input coupled to an output of the second logic gate, the second logic gate having a first input coupled to an output of the second inverter and a second input coupled to an output of the first logic gate.

16. The data processing system of claim 15, wherein each of the first and the second logic gates is characterized as an NAND gate.

17. The data processing system of claim 8, further comprising a precharge circuit coupled to a bit line of each SRAM cell of the plurality of SRAM cells, wherein the precharge circuits are configured to precharge the bit line of each SRAM cell of the plurality of SRAM cells prior to the selection circuit selecting one or more word lines coupled to the plurality of SRAM cells in response to the challenge.

18. The method of claim 8, wherein the PUF evaluation engine is configured to evaluate logic bits provided by the first and second outputs of the cross-coupled latch, wherein evaluating the logic bits comprises:
  when the current on the bit line of the first SRAM cell is greater than the current on the bit line of the second SRAM cell, the cross-coupled latch changes only the first output of the cross-coupled latch to a second logic state, different than the first logic state, while the second output remains unchanged, and
  when the current on the bit line of the second SRAM cell is greater than the current on the bit line of the first SRAM cell, the cross-coupled latch changes only the second output of the cross-coupled latch to a second logic state while the first output remains unchanged, wherein the digital code includes the evaluated logic bits provided by the first and second outputs of the cross-coupled latch.

19. A data processing system comprising:
   a processor core;
   an SRAM array coupled to the processor core, the SRAM array having a plurality of SRAM cells, each SRAM cell of the plurality of SRAM cells coupled to a bit line and to a word line, wherein the plurality of SRAM cells provides a physically unclonable function (PUF);
   a PUF evaluation engine coupled to the plurality of SRAM cells, the PUF evaluation engine comprising:
      a selection circuit for selecting one or more word lines coupled to the plurality of SRAM cells in response to a challenge,
      an inverter coupled to each of two bit lines corresponding to two different SRAM cells of the plurality of SRAM cells, and
      a cross-coupled latch coupled to outputs of the inverters coupled to the two bit lines, wherein the cross-coupled latch is configured to provide one of two 2-bit values depending on which of the two bit lines discharges faster upon the two different SRAM cells being selected by the selection circuit, wherein the 2-bit value is part of a digital code provided in response to the challenge; and
   a precharge circuit coupled to a bit line of each SRAM cell of the plurality of SRAM cells, wherein the precharge circuits are configured to precharge the bit line of each SRAM cell of the plurality of SRAM cells prior to the selection circuit selecting one or more word lines coupled to the plurality of SRAM cells in response to the challenge.

20. The data processing system of claim 19, wherein the plurality of SRAM cells includes N cells, where N is an even integer greater than 1, and are grouped into N/2 groups of two SRAM cells, wherein the PUF evaluation engine comprises N inverters coupled to bit lines of the N cells and N/2 cross-coupled latches, each cross-coupled latch coupled to a group of two SRAM cells, the cross-coupled latch coupled to a first bit line corresponding to a first SRAM cell of the group via a first inverter of the N inverters and a second bit line corresponding to a second SRAM cell of the group via a second inverter of the N inverters, wherein each cross-coupled latch provides a corresponding 2-bit value that is part of the digital code provided in response to the challenge.

\* \* \* \* \*